United States Patent [19]

Walter

[11] Patent Number: 5,045,084
[45] Date of Patent: Sep. 3, 1991

[54] PROCESS FOR TRICHROMATIC DYEING OR PRINTING

[75] Inventor: Harald Walter, Basel, Switzerland

[73] Assignee: Ciba-Geigy Corporation, Ardsley, N.Y.

[21] Appl. No.: 599,588

[22] Filed: Oct. 18, 1990

[30] Foreign Application Priority Data

Oct. 23, 1989 [CH] Switzerland .................. 3827/89

[51] Int. Cl.$^5$ .............................................. C09B 67/22
[52] U.S. Cl. ............................................. 8/641; 8/639;
8/643; 8/681; 8/683; 8/684; 8/687; 8/690;
8/692; 8/917; 8/924
[58] Field of Search .................................. 8/641, 643

[56] References Cited

U.S. PATENT DOCUMENTS

| | | | |
|---|---|---|---|
| 3,692,769 | 9/1972 | Weaver et al. | 8/693 |
| 4,396,393 | 8/1983 | Schaetzer et al. | 8/643 |
| 4,402,704 | 9/1983 | Raisin et al. | 8/641 |
| 4,445,905 | 5/1984 | Schaetzer et al. | 8/641 |
| 4,537,598 | 8/1985 | Schaetzer et al. | 8/641 |
| 4,579,561 | 4/1986 | Rowe et al. | 8/641 |
| 4,652,269 | 3/1987 | Bowles et al. | 8/641 |
| 4,840,643 | 6/1989 | Rowe | 8/641 |

FOREIGN PATENT DOCUMENTS 387201  9/1990  European Pat. Off. .
388353  9/1990  European Pat. Off. .

Primary Examiner—A. Lionel Clingman
Attorney, Agent, or Firm—George R. Dohmann; Edward M. Roberts

[57] ABSTRACT

A process for the trichromatic dyeing or printing of natural and synthetic polyamide fibre materials, which comprises using at least one red dye of the formula

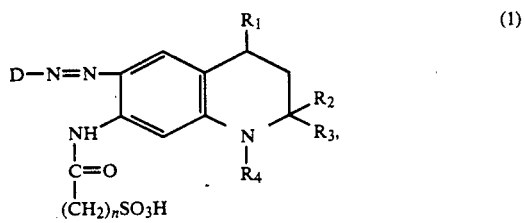

in which $D, R_1, R_2, R_3, R_4$ and n are as defined in claim 1, together with at least one yellow or orange dye of the formula

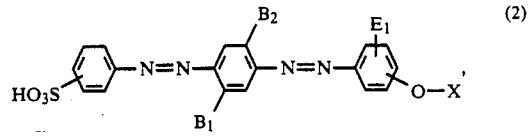

in which $B_1, B_2, E_1$ and X are as defined in claim 1, or

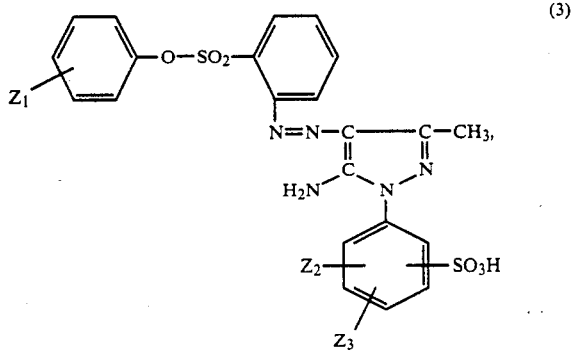

in which $Z_1, Z_2$ and $Z_3$ are as defined in claim 1, or mixtures of dyes of the formulae (2) and (3), or a yellow dye of the formula

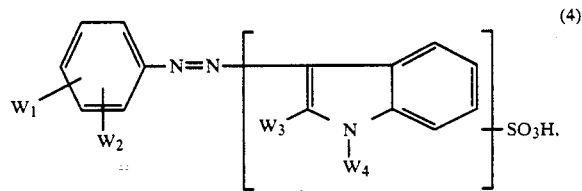

in which $W_1, W_2, W_3$ and $W_4$ are as defined in claim 1, or mixtures of dyes of the formulae (2),(3) and (4) and at least one blue dye of the formula

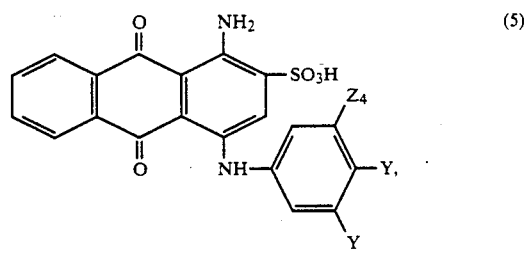

in which one Y and $Z_4$ are as defined in claim 1 are used.

The process according to the invention is suitable for dying natural or synthetic polyamide materials from aqueous liquor or for printing with printing pastes; and in particular for dyeing from short liquors.

13 Claims, No Drawings

PROCESS FOR TRICHROMATIC DYEING OR PRINTING

The present invention relates to a process for the trichromatic dyeing or printing of natural and synthetic polyamide materials using at least one blue-dyeing, sulfo-containing anthraquinone dye, at least one red-dyeing, sulfo-containing azo dye and at least one yellow- or orange-dyeing, sulfo-containing azo dye.

The object of the present invention was to find a process for the dyeing or printing of natural and synthetic polyamide materials using dyes suitable for the combination dyeing by the trichromatic principle.

It has now been found that this object can be achieved according to the invention by the process described below. The dyeings thus obtained fulfil the object. The dyeings obtained are distinguished in particular by a uniform colour build-up in combination with constancy of shade in various concentrations and good compatibility.

The present invention relates to a process for the trichromatic dyeing or printing of natural and synthetic polyamide fibre materials, which comprises using at least one red dye of the formula

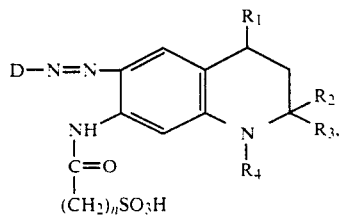

in which D is a diazo component of the benzene or naphthalene series, $R_1$, $R_2$, $R_3$ and $R_4$, independently of one another, are hydrogen or substituted or unsubstituted $C_1$-$C_8$alkyl and n is the number 1,2,3,4 or 5, together with at least one yellow or orange dye of the formula

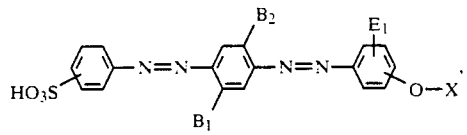

in which $B_1$, $B_2$ and $E_1$ are hydrogen, $C_{1-4}$alkyl or $C_{1-4}$alkoxy and X is straight-chain or branched $C_{1-4}$alkyl or straight-chain or branched $C_{2-4}$hydroxyalkyl, or

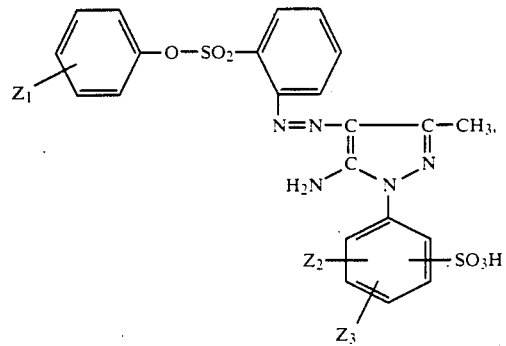

in which $Z_1$, $Z_2$ and $Z_3$, independently of one another, are hydrogen, halogen, $C_{1-4}$alkyl or $C_{1-4}$alkoxy, or mixtures of dyes of the formulae (2) and (3), or a yellow dye of the formula

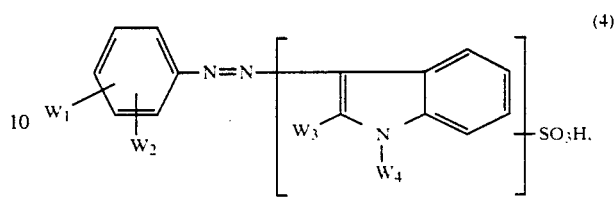

in which $W_1$ is hydrogen, $C_{1-4}$alkyl, $C_{1-4}$alkoxy, halogen, $C_{2-4}$alkanoylamino or a substituted or unsubstituted arylsulfonyl, aryloxy or arylcarbonyl radical, $W_2$ is hydrogen, halogen, a substituted or unsubstituted alkyl, aryloxy or aryloxysulfonyl radical or a radical of the formula

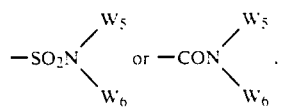

$W_3$ is a substituted or unsubstituted alkyl or aryl radical, $W_4$ is hydrogen or alkyl and $W_5$ and $W_6$, independently of one another, are hydrogen or a substituted or unsubstituted alkyl, cycloalkyl or aryl radical, or mixtures of dyes of the formulae (2), (3) and (4) and at least one blue dye of the formula

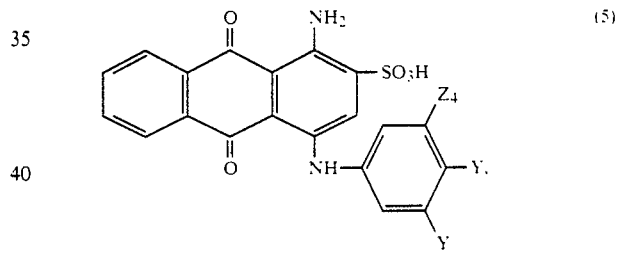

in which one Y is hydrogen or methyl and the other Y is $C_{2-4}$alkanoylamino or $C_2$-$C_4$hydroxyalkylsulfamoyl and $Z_4$ is hydrogen or methyl.

Trichromatic dyeing is understood to mean the additive colour mixing of appropriately selected yellow- or orange-, red- and blue-dyeing dyes by means of which any desired hue of the visible colour spectrum can be obtained by suitable selection of the relative amounts of the dyes.

The radical D in formula (1) can contain the substituents customary for diazo components, for example alkyl groups of 1 to 8, preferably 1 to 4, carbon atoms, such as methyl, ethyl, propyl, isopropyl, butyl, isobutyl, sec-butyl, tert-butyl, hexyl, octyl, it being possible for the alkyl groups to be substituted by sulfo or sulfato, alkoxy groups of 1 to 8 carbon atoms, in particular 1 to 4 carbon atoms, such as methoxy, ethoxy, propoxy, isopropoxy, butoxy, acylamino groups, such as alkanoylamino groups of 2 to 8 carbon atoms and alkoxycarbonylamino groups of 2 to 8 carbon atoms, such as acetylamino, propionylamino, methoxycarbonylamino, ethoxycarbonylamino, alkanoyl groups of 2 to 8, preferably 2 to 4, carbon atoms, such as acetyl, propionyl, butyryl or isobutyryl, $C_5$-$C_7$cycloalkylcarbonyl, such as cyclohexylcarbonyl, $C_5$-$C_7$cycloalkylcarbonyl substituted in the cycloalkyl ring by $C_1$-$C_4$alkyl, such as methyl, ethyl, propyl, butyl or halogen, such as fluorine, chlorine, bromine, sulfo or sulfato, benzoyl, benzoyl substituted in the phenyl ring by $C_1$-$C_4$alkyl, such as methyl, ethyl, propyl, butyl or halogen, such as fluorine, chlorine, bromine, sulfo or sulfato, unsubstituted or $C_1$-$C_4$alkyl-, halogen-, sulfo- or sulfato-substituted benzothiazole or benzoxazole, benzoylamino, amino, mono- or dialkylamino of 1 to 8 carbon atoms in the alkyl radical, phenylamino, alkoxycarbonyl of 1 to 8 carbon atoms in the alkoxy radical, $C_5$-$C_7$cycloalkylaminosulfonyl, nitro, cyano, trifluoromethyl, halogen, such as fluorine, bromine, or in particular chlorine, sulfamoyl, sulfamoyl mono- or disubstituted on the nitrogen atom by $C_1$-$C_4$alkyl, $C_5$-$C_7$cycloalkyl or phenyl, carbamoyl, ureido, hydroxyl, $C_1$-$C_8$alkylsulfonyl, $C_1$-$C_8$alkylaminosulfonyl, phenylsulfonyl which is unsubstituted or substituted in the phenyl ring by $C_1$-$C_4$alkyl, halogen, such as fluorine, chlorine, bromine, sulfo or sulfato, carboxyl, sulfomethyl, sulfo, sulfato, thiosulfato, arylazo groups, such as the phenylazo and naphthylazo group and phenyl, naphthyl, phenoxy, phenoxysulfonyl, phenylaminosulfonyl, it being possible for the phenyl or naphthyl radicals mentioned to be further substituted by the abovementioned substituents. If desired, two adjacent substituents of the ring systems mentioned can each form further fused-on phenyl rings or cyclohexyl rings.

Examples of suitable $C_1$-$C_8$alkyl radicals for $R_1$, $R_2$, $R_3$ and $R_4$ in formula (1) are:

methyl, ethyl, propyl, isopropyl, butyl, isobutyl, sec-butyl, tert-butyl, pentyl, hexyl, heptyl or octyl, and the corresponding radicals which are substituted, for example, by hydroxyl, alkoxy with 1 to 4 carbon atoms, such as methoxy, ethoxy, propoxy, isopropoxy or butoxy, sulfo, sulfato, thiosulfato, cyano or halogen, such as fluorine, chorine or bromine, and phenyl, it being possible for the phenyl radical to be futher substituted by the abovementioned substituents.

Suitable alkyl radicals for $B_1$, $B_2$, $E_1$, X, $Z_1$, $Z_2$ and $Z_3$ in the formulae (2) and (3) are, independently of one another, straight-chain or branched alkyl radicals, such as methyl, ethyl, propyl, isopropyl, butyl, sec-butyl, isobutyl and tert-butyl.

Suitable halogens for $Z_1$, $Z_2$ and $Z_3$ in formula (3) are fluorine or bromine and in particular chlorine.

Examples of suitable $C_{2-4}$alkanoylamino radicals for Y in formula (5) are acetylamino, propionylamino or butyrylamino.

Examples of suitable alkoxy radicals for $B_1$, $B_2$, $E_1$, $Z_1$, $Z_2$ and $Z_3$ in formulae (2) and (3) are methoxy, ethoxy, propoxy, isopropoxy, butoxy, sec-butoxy, isobutoxy or tert-butoxy.

A suitable hydroxyalkyl radical for X in formula (2) is a straight-chain or branched hydroxyalkyl radical, such as β-hydroxyethyl, β-hydroxypropyl, β-hydroxybutyl or α-ethyl-β-hydroxyethyl.

Examples of suitable $C_{2-4}$hydroxyalkylsulfamoyl radicals for Y in formula (5) are β-hydroxyethylsulfamoyl, β-hydroxypropylsulfamoyl, γ-hydroxypropylsulfamoyl or β-hydroxybutylsulfamoyl.

$C_{1-4}$alkyl as $W_1$ in formula (4) is methyl, ethyl, n-propyl, isopropyl, n-butyl, sec-butyl, isobutyl or tert-butyl.

$C_{1-4}$alkoxy as $W_1$ in formula (4) is methoxy, ethoxy, n-propoxy, isopropoxy, n-butoxy, sec-butoxy, isobutoxy or tert-butoxy.

$C_{2-4}$alkanoylamino as $W_1$ in formula (4) is, for example, acetylamino, propionylamino or butyrylamino.

In a substituted or unsubstituted arylsulfonyl, aryloxy or arylcarbonyl radical as $W_1$ in formula (4), aryl is preferably a radical of the benzene or naphthalene series which may be further substituted, for example by $C_{1-4}$alkyl groups, such as methyl and ethyl, $C_{1-4}$alkoxy groups, such as methoxy and ethoxy, halogen, such as fluorine, chlorine and bromine, alkanoylamino groups of 1 to 6 carbon atoms, such as acetylamino, and hydroxyl.

Halogen as $W_1$ and/or $W_2$ is fluorine, chlorine or bromine.

In a substituted or unsubstituted aryloxy or aryloxysulfonyl radical as $W_2$ in formula (4), aryl is a radical of the benzene or napthalene series which may be further substituted, for example by $C_{1-4}$alkyl groups, such as methyl and ethyl, $C_{1-4}$alkoxy groups, such as methoxy and ethoxy, halogen, such as fluorine, chlorine and bromine, alkanoylamino groups of 1 to 6 carbon atoms, such as acetylamino, and hydroxyl.

A substituted or unsubstituted alkyl radical as $W_2$, $W_3$, $W_5$ or $W_6$ in formula (4) is, independently of one another, preferably a straight-chain or branched $C_{1-12}$alkyl, in particular $C_{1-4}$alkyl radical, which may be further substituted, for example, by halogen, such as fluorine, chlorine or bromine, hydroxyl, cyano, $C_{1-4}$alkoxy, such as methoxy or ethoxy, and alkanoyl groups of 1 to 6 carbon atoms, such as acetyl or propionyl, and benzoyl. The alkyl radical $W_3$ can also be substituted by sulfo. Examples of $W_2$, $W_3$, $W_5$ and $W_6$ as alkyl radical are: methyl, ethyl, propyl, isopropyl, butyl, sec-butyl, tert-butyl, isobutyl and trifluoromethyl.

A substituted or unsubstituted aryl radical as $W_3$, $W_5$ and $W_6$ in formula (4) is, independently of one another, preferably from the benzene or naphthalene series and may be further substituted, for example by $C_{1-4}$alkyl groups, such as methyl, $C_{1-4}$alkoxy groups, such as methoxy and ethoxy, halogen, such as fluorine, chlorine or bromine, trifluoromethyl, alkanoylamino groups of 1 to 6 carbon atoms, such as acetylamino, hydroxyl and carboxyl. The aryl radical $W_3$ can also be substituted by sulfo. $W_3$, $W_5$ and $W_6$ as aryl radical is in particular a phenyl radical which may be substituted by methyl, trifluoromethyl and chlorine.

A suitable alkyl radical as $W_4$ in formula (4) is preferably a straight-chain or branched $C_{1-12}$alkyl and in particular $C_{1-8}$alkyl radical. Examples are: methyl, ethyl, propyl, isopropyl, butyl, sec-butyl, tert-butyl, isobutyl, 1-pentyl, 3-pentyl, 1-heptyl, 3-heptyl and 1-octyl.

A substituted or unsubstituted cycloalkyl radical as $W_5$ and $W_6$ is, independently of one another, preferably a cycloalkyl group containing 5 to 7-membered rings which may be further substituted, for example by $C_{1-4}$alkyl, such as methyl. A suitable radical is in particular the cyclohexyl group.

A preferred embodiment of the process according to the invention is one in which a red dye of the formula

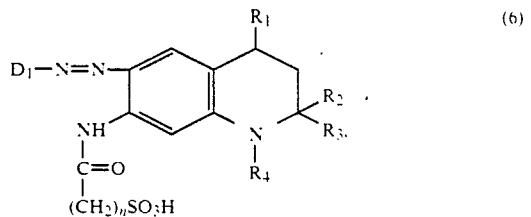
(6)

is used, in which D₁ is phenyl or naphthyl and each of these radicals can be substituted by C₁-C₈alkyl, C₁-C₈alkoxy, C₂-C₈alkanoylamino, C₂-C₈alkoxycarbonylamino, C₂-C₈alkanoyl, C₅-C₇cycloalkylcarbonyl, C₅-C₇cycloalkylcarbonyl which is substituted in the cycloalkyl ring by C₁-C₄alkyl, halogen, sulfo or sulfato, benzoyl, benzoyl which is substituted in the phenyl ring by C₁-C₄alkyl, halogen, sulfo or sulfato, benzothiazole, benzoxazole, C₁-C₄alkyl-, halogen-, sulfo or sulfato-substituted benzothiazole or benzoxazole, benzoylamino, amino, mono- or dialkylamino of 1 to 8 carbon atoms in the alkyl radical, phenylamino, C₂-C₈alkoxycarbonyl, nitro, cyano, trifluoromethyl, halogen, sulfamoyl, sulfamoyl which is mono- or disubstituted on the nitrogen atom by C₁-C₄alkyl, C₅-C₇cycloalkyl or phenyl, carbomoyl, ureido, hydroxyl, C₁-C₈alkylsulfonyl, phenylsulfonyl, phenylsulfonyl which is substituted in the phenyl ring by C₁-C₄alkyl, halogen, sulfo or sulfato, carboxyl, sulfomethyl, sulfo, sulfato, thiosulfato and phenylazo and naphthylazo groups, and, if appropriate, 2 adjacent substituents of the ring systems mentioned can each form further fused-on phenyl rings or cyclohexyl rings and R₁, R₂, R₃, R₄ and n are as defined under formula (1), in which each of the radicals mentioned above for D₁ can preferably be substituted by C₁-C₈alkyl, C₁-C₈alkoxy, C₂-C₈alkanoylamino, C₂-C₈alkoxycarbonylamino, C₂-C₈alkoxycarbonylamino, C₂-C₈alkanoyl, C₅-C₇cycloalkylcarbonyl, C₅-C₇cycloalkylcarbonyl which is substituted in the cycloalkyl ring by C₁-C₄alkyl or halogen, benzoyl, benzoyl which is substituted in the phenyl ring by C₁-C₄alkyl or halogen, benzothiazole, benzoxazole, benzoylamino, amino, mono- or dialkylamino of 1 to 8 carbon atoms in the alkyl radical, phenylamino, C₂-C₈alkoxycarbonyl, nitro, cyano, trifluoromethyl, halogen, sulfamoyl, sulfamoyl which is mono- or disubstituted on the nitrogen atom by C₁-C₄alkyl, C₅-C₇cycloalkyl or phenyl, carbamoyl, ureido, hydroxyl, C₁-C₈alkylsulfonyl, phenylsulfonyl, phenylsulfonyl which is substituted in the phenyl ring by C₁-C₄alkyl and/or halogen, carboxyl, sulfomethyl, sulfo, sulfato, thiosulfato and phenylazo and naphthylazo groups, and, if desired, 2 adjacent substituents of the ring systems mentioned can each form further fused-on phenyl rings or cyclohexyl rings and R₁, R₂, R₃, R₄ and n are as defined under formula (1).

A particularly preferred embodiment of the process according to the invention is one in which a red dye of the formula

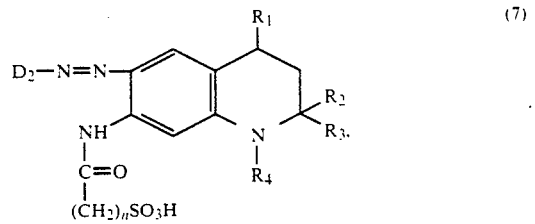

is used, in which D₂ is phenyl which can be substituted by C₁-C₈alkyl, C₂-C₈alkanoyl, C₂-C₈alkoxycarbonyl, C₅-C₇cycloalkylcarbonyl, benzoyl, benzoyl which is substituted in the phenyl ring by C₁-C₄alkyl, halogen, sulfo or sulfato, benzothiazole, benzoxazole, C₁-C₄alkyl-, halogen-, sulfo- or sulfato-substituted benzothiazole or benzoxazole, halogen, phenylsulfonyl, phenylsulfonyl which is substituted in the phenyl ring by C₁-C₄alkyl, halogen, sulfo or sulfato, C₁-C₈alkylsulfonyl, sulfamoyl which is mono- or disubstituted on the nitrogen atom by C₁-C₄alkyl, C₅-C₇cycloalkyl or phenyl, and R₁, R₂, R₃, R₄ and n are as defined under formula (1), in which the radical mentioned above for D₂ is preferably substituted by C₁-C₈alkyl, C₂-C₈alkanoyl, C₂-C₈alkoxycarbonyl, C₅-C₇cycloalkylcarbonyl, C₁-C₄alkylsulfonyl, benzoyl, benzoyl which is substituted in the phenyl ring by C₁-C₄alkyl or halogen, benzothiazole, benzoxazole, halogen, phenylsulfonyl, phenylsulfonyl which is substituted in the phenyl ring by C₁-C₄alkyl or halogen, sulfamoyl which is substituted by C₁-C₈alkyl, C₅-C₇cycloalkyl or phenyl, and R₁, R₂, R₃, R₄ and n are as defined under formula (1).

In the processes according to the invention, red dyes of the formula (1), (6) or (7), in which R₁ is hydrogen or C₁-C₄alkyl, in particular methyl, R₂ and R₃, independently of one another, are hydrogen or C₁-C₄alkyl, in particular methyl, R₄ is C₁-C₄alkyl, in particular ethyl and n is the number 1 or 2 are particularly preferably used.

Further preferred embodiments of the process according to the invention are those in which at least one yellow or orange dye of the formula

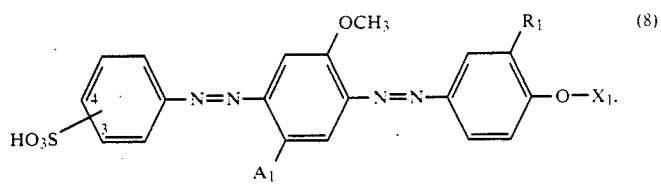

is used, in which A₁ is hydrogen or methyl, F₁ is hydrogen or methyl and X₁ is methyl, ethyl, β-hydroxyethyl, β-hydroxypropyl, β-hydroxybutyl or α-ethyl-β-hydroxyethyl, and the sulfo group is bound in the 3 or 4 position, or a mixture of at least one dye of the formula (8) and a yellow dye of the formula

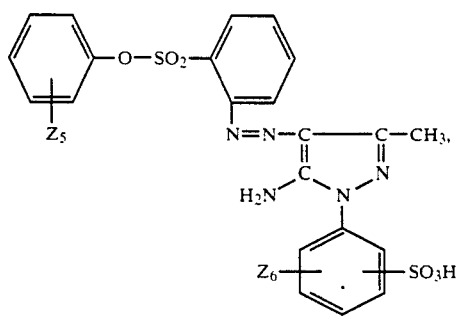

(9)

in which $Z_5$ and $Z_6$, independently of one another, are hydrogen, methyl or chlorine, or a yellow dye of the formula

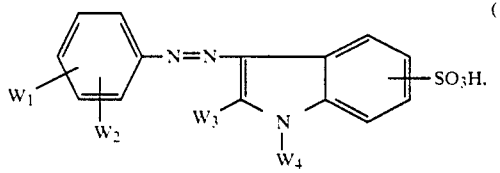

(10)

in which $W_1$ is hydrogen, methyl, chlorine, methoxy, ethoxy, o-methylphenoxy, phenoxy, acetylamino, phenylsulfonyl, p-methylphenylsulfonyl, p-chlorophenylsulfonyl, naphthylsulfonyl, p-methylbenzoyl or p-chlorobenzoyl, $W_2$ is hydrogen, chlorine, methyl, trifluoromethyl, o-methylphenoxy, o-chlorophenoxy, o-chlorophenoxysulfonyl, —$SO_2NH_2$, N-$C_{1-2}$alkylaminosulfonyl, N,N-dimethylaminosulfonyl, N-methyl-N-$\beta$-hydroxyethylaminosulfonyl, N-methyl-N-cyclohexylaminosulfonyl, N-phenylaminosulfonyl, N-o-methylphenylaminosulfonyl, N-o-chlorophenylaminosulfonyl, N-m-trifluoromethylphenylaminosulfonyl, N-ethyl-N-phenylaminosulfonyl, —$CONH_2$ or —$CON(CH_3)_2$, $W_3$ is methyl or phenyl and $W_4$ is hydrogen, methyl, ethyl or octyl, or a mixture of at least one dye of the formula (8) and a dye of the formula (10) are used together with at least one blue dye of the formula

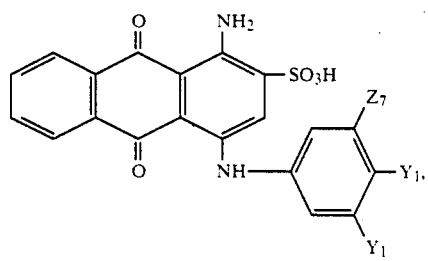

(11)

in which $Y_1$ is hydrogen or methyl and the other $Y_1$ is acetylamino, propionylamino or $C_{2-4}$hydroxyalkylsulfamoyl and $Z_7$ is hydrogen or methyl, or a mixture of the blue dyes of the formula

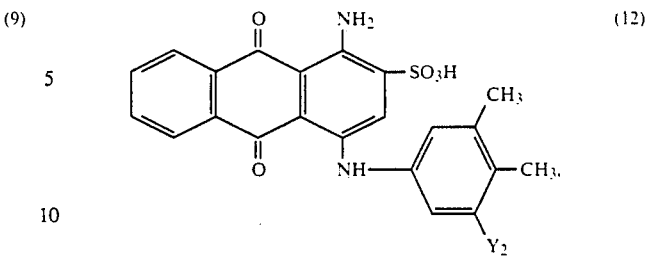

(12)

in which $Y_2$ is a $C_{2-4}$hydroxyalkylsulfamoyl radical, and

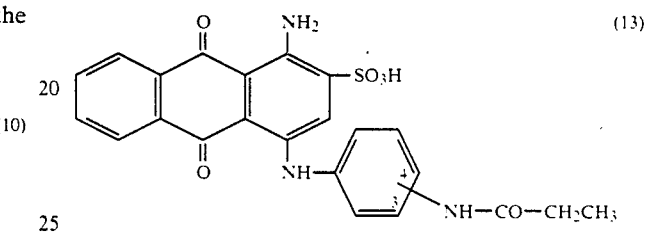

(13)

in which the radical —NH—CO—$CH_2CH_3$ is bound in the 3 or 4 position.

A very particularly preferred embodiment of the process according to the invention is one in which a red dye of the formula

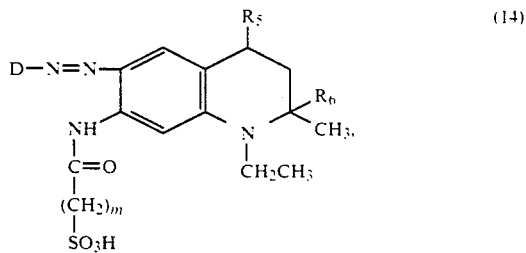

(14)

in which $R_5$ and $R_6$, independently of one another, are hydrogen or methyl, m is the number 1 or 2 and D is as defined under formula (1), in particular in which D is as defined for $D_1$ under formula (6) or for $D_2$ under formula (7), is used.

Embodiments of the process according to the invention of very particular importance are those in which a red dye of the formula

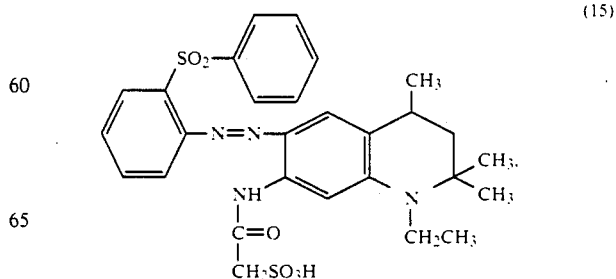

(15)

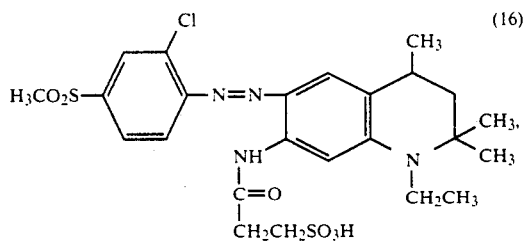 (16)

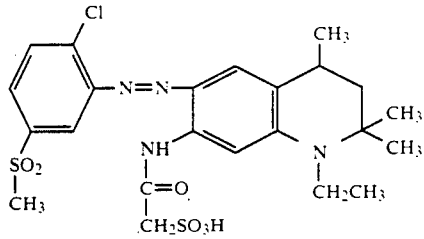 (22)

is used together with the yellow dye of the formula

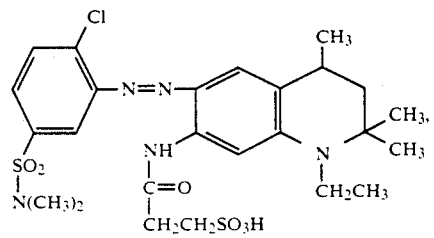 (17)

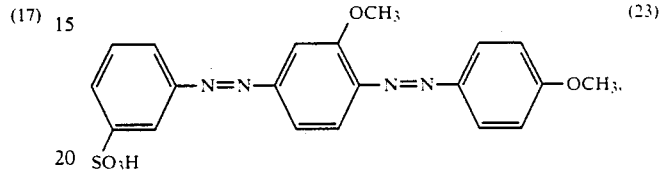 (23)

or the orange dye of the formula

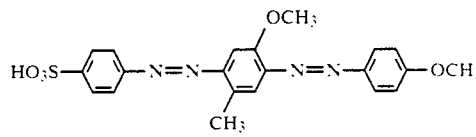 (24)

or a mixture of the yellow dye of the formula (23) with the orange dye of the formula (24) or a mixture of the dyes of the formula (23) and/or (24) with the dye of the formula (18)

(19)

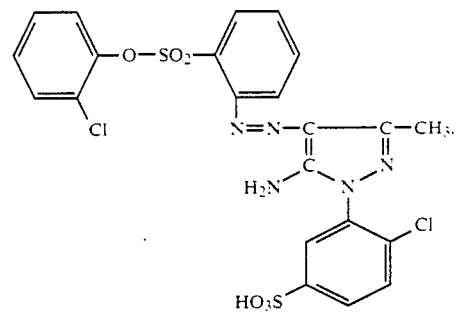 (25)

(20)

in which the weight ratio of the dyes of the formulae (23) and (24) is 60:40 to 40:60 and in particular 1:1 and the weight ratio of the dyes of the formulae (23) or (24) and (25) is 80:20 to 20:80 and in particular 70:30, and the weight ratio of the dyes of the formulae (23), (24) and (25) is 60:20:20, 20:60:20 to 20:20:60 and in particular 1:1:1, or the yellow dye of the formula

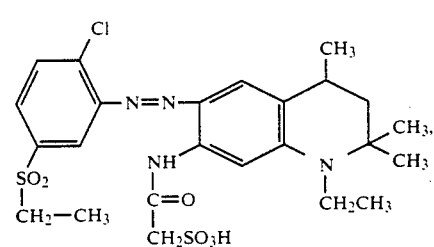 (21)

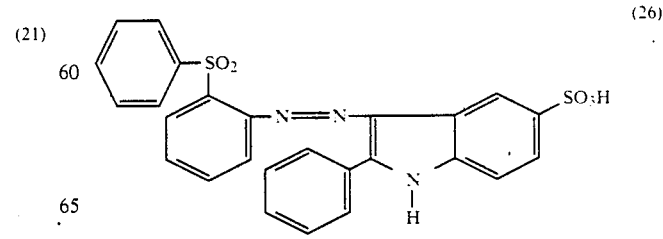 (26)

and at least one of the blue dyes of the formulae

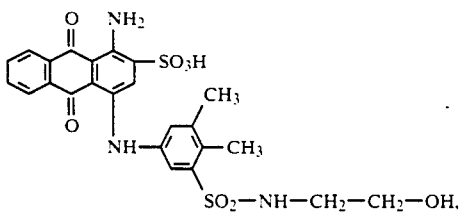 (27)

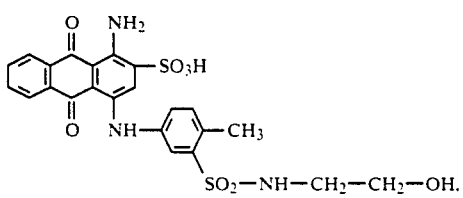 (28)

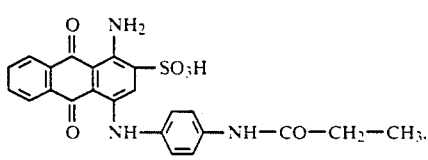 (29)

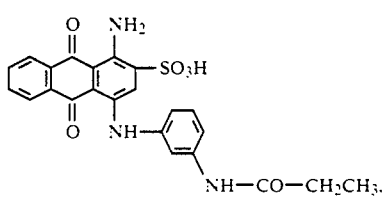 (30)

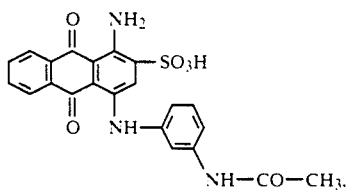 (31)

or a mixture of a dye of the formula (27) or (28) with a dye of the formula (29), (30) or (31) is used.

The dyes of the formulae (2), (3), (4) and (5) which are used in the processes according to the invention for the trichromatic dyeing or printing are known, for example, from EP-A 181,292 and EP-A 127,579 and can be prepared in analogy to known processes. The dyes of the formula (1) are prepared by diazotizing an amine of the formula $$D-NH_2 \quad (32)$$

and coupling the product onto a coupling component of the formula

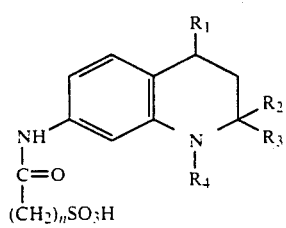 (33)

in which D, $R_1$, $R_2$, $R_3$, $R_4$ and n are as defined under formula (1).

The amines of the formula (32) are known per se and can be prepared in analogy to known processes.

The coupling components of the formula (33) are prepared, for example, by reacting a compound of the formula

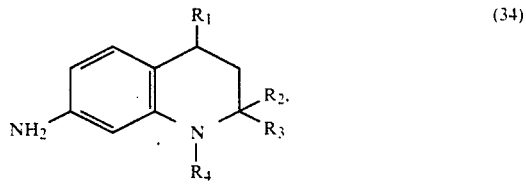 (34)

in which $R_1$, $R_2$, $R_3$ and $R_4$ are as defined under formula (1), with a compound of the formula $$X-(CH_2)_n-\overset{O}{\underset{\|}{C}}-Y. \quad (35)$$

in which X and Y are each an anionic leaving group and n is as defined under formula (1), to give a compound of the formula

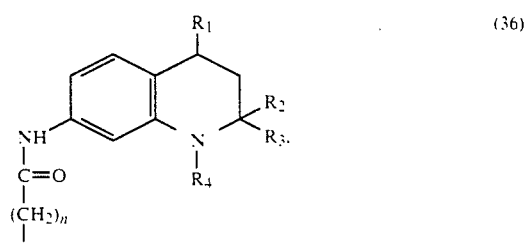 (36)

in which $R_1$, $R_2$, $R_3$, $R_4$ and n are as defined under formula (1) and X is as defined under formula (35), and reacting the compound of the formula (36) by exchanging the radical X for a sulfo group to give a compound of the formula (33).

Examples of suitable X and Y in formula (35) are, independently of one another, halogen, for example fluorine, chlorine or bromine. X and Y are each in particular chlorine. Examples of compounds of the formula (35) are chloroacetyl chloride, 3-chloropropionyl chloride, 4-chlorobutyryl chloride and 5-valeryl chloride. Instead of the compound of the formula (35) the corresponding anhydrides, for example chloroacetic anhydride, can also be used.

The reaction of the compound of the formula (34) with the compound of the formula (35) can be carried out in water or organic solvents, for example tetrahydrofuran, dioxane or benzene, at temperatures of −10° to 80° C., in particular at temperatures of 0° to 40° C.

The introduction of the sulfo group into the compound of the formula (36) is effected by exchanging the radical X by a sulfo group, for example using $Na_2SO_3$ in a solvent, for example water or a water/ethanol mixture, at temperatures of 60° to 100° C., in particular at temperatures of 85° to 100° C., in an acidic, neutral to alkaline pH, in particular a pH from 5 to 9.

In the case where mixtures of dyes are used in the process according to the invention, they can be prepared by mixing the individual dyes. This mixing process is carried out, for example, in suitable mills, for example ball and pinned disc mills, and in kneaders or mixers.

The mixtures of dyes can furthermore be prepared by spray-drying the aqueous dye mixtures.

The dyes used in the process according to the invention are present either in the form of their free sulfonic acid or preferably as their salts.

Examples of suitable salts are the alkali metal salts, alkaline earth metal salts or ammonium salts or the salts of an organic amine. Examples are the sodium salts, lithium salts, potassium salts or ammonium salts or the salt of triethanolamine.

The dyes used in the process according to the invention usually contain further additives, for example common salt or dextrine.

The process according to the invention for trichromatic dyeing or printing can be applied to the conventional dyeing and printing processes. The dyeing liquors or printing pastes can contain, apart from water and the dyes, further additives, for example wetting agents, antifoams, levelling agents or agents influencing the property of the textile material, for example fibre softeners, additives for fire-retardant finishing or soil-, water- and oil-repellent agents and water softeners and natural or synthetic thickeners, for example alginates and cellulose ethers.

The process according to the invention is suitable in particular for dyeing from short liquors, for example in the continuous dyeing process or the batchwise and continuous foam dyeing process.

The dyes used in the process according to the invention are distinguished in the trichromatic dyeing or printing by uniform colour build up, good attachment to the fibre, good constancy of shade even in different concentrations, good fastness properties, for example good resistance to formaldehyde, and in particular by very good compatibility.

The process according to the invention is suitable for the dyeing or printing not only of natural polyamide materials, for example wool, but also in particular of synthetic polyamide materials, for example nylon-6 or nylon-6,6 and is suitable for the dyeing or printing of wool or synthetic polyamide mixed fabrics or yarns.

The textile material mentioned can be present in a wide range of processing forms, for example as fibre, yarn, woven fabric or knitted fabric and in particular in the form of carpet.

In the examples which follow, parts are by weight. The temperatures are given in degrees centigrade. Parts by weight relate to parts by volume as the gram relates to the cubic centimeter.

EXAMPLE 1

10 parts of a nylon-6,6 fibre material (Helanca knitted fabric) are dyed in 500 parts of an aqueous liquor containing 2 g/l of ammonium acetate and being adjusted to a pH of 5 with acetic acid. 0.05% of the red dye which, in the form of the free acid, has the formula

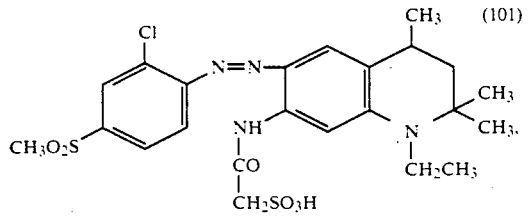

0.18% of the yellow dye which, in the form of the free acid, has the formula

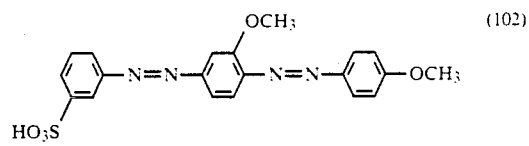

and 0.17% of the blue dye which, in the form of the free acid, has the formula

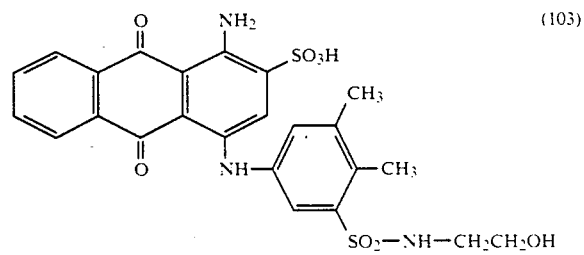

are used as dyes, the stated amounts being based on the weight of the fibre.

The dyeing time at a temperature of 98° is 30 to 90 minutes. The dyed polyamide fibre material is then removed and rinsed and dried as usual to give a fabric dyed completely levelly in a brown hue and having no material-related streaks whatsoever.

EXAMPLE 2

10 parts of a nylon-6,6 yarn are dyed in 400 parts of an aqueous liquor which contains 1.5 g/l of ammonium acetate and has been adjusted to a pH of 5.5 with acetic acid are dyed. 0.1% of the dye which, in the form of the free acid, has the formula

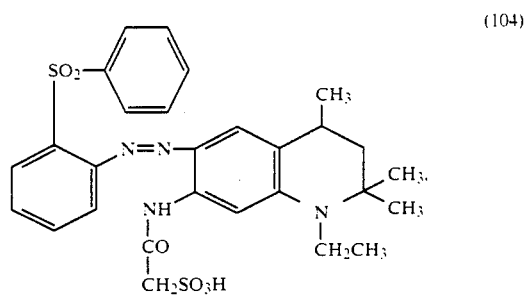

0.13% of the dye of the formula (102) and 0.12% of the dye of the formula (103) are used as dyes, the stated amounts being based on the fibre weight. The dye bath is heated to 98° C. over a period of 30 minutes and kept at 96° to 98° for 60 minutes. The dyed yarn is then removed and rinsed and dried as usual to give a yarn dyed in a brown hue.

EXAMPLE 3

10 parts of nylon-6,6 carpet yarn are dyed in 400 parts of an aqueous liquor which contains 1.5 g/l of ammonium acetate and has been adjusted to a pH of 5.5 with acetic acid. 0.15% of the red dye of the formula (101), 0.625% of the yellow dye which, in the form of the free acid, has the formula

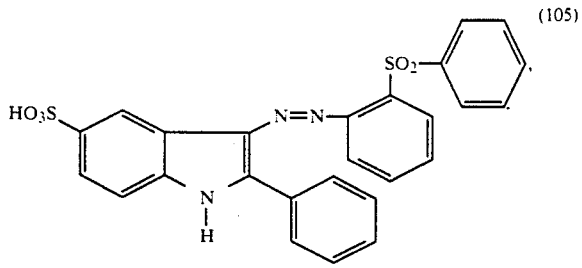

and 0.52% of the blue dye of the formula (103) are used as dyes, the stated amount being based on the fibre weight. The dye bath is heated to 98° over a period of 30 minutes and kept at 96° to 98° for 60 minutes. The dyed yarn is then removed and rinsed and dried as usual to give a yarn dyed in a brown hue.

EXAMPLE 4

The procedure given in Example 3 is repeated, except that
0.32% of the dye of the formula (104),
0.46% of the dye of the formula (105) and
0.61% of the dye of the formula (103) are used instead of the dyes of the formulae (101), (105) and (103), to give likewise a yarn dyed in a brown hue.

EXAMPLE 5

(Carpet Printing)

A nylon-6 velour carpet having a pile weight of 400 g/m² is padded for the purpose of ground dyeing with an aqueous padding liquor of the following composition
0.1 g/l of the dye of the formula (102),
0.1 g/l of the dye of the formula (103),
2 g/l of a thickener based on natural polysaccharides,
0.5 g/l of wetting agent based on a sulfated alkyl aryl polyglycolate, and
0.5 g/l of an antifoam based on high-boiling alcohols, which has been adjusted to a pH of 4.5 with acetic acid, and squeezed off to a liquor pickup of 80%. A pattern is applied to the carpet thus pretreated through a printing screen by means of the aqueous printing paste below:
1 g/l of the dye of the formula (102),
20 g/l of the dye of the formula (101),
10 g/l of the dye of the formula (103),
15 g/l of a thickener based on natural polysaccharides,
2 g/l of a wetting agent based on a sulfated alkyl aryl polyglycolate,
1 g/l of an antifoam based on high-boiling alcohols.
The printing paste has been adjusted to a pH of 4.5 with acetic acid.

The printed material is then treated with saturated steam at 101° for 5 minutes to fix the dyes, rinsed, neutralized, rinsed again and dried.

A velour carpet having a bordeaux pattern on a pale olive ground which has very sharp contrast, good penetration and no "frosting" whatever is obtained.

EXAMPLE 6

(Carpet Continuous Dyeing)

2.7 parts of the yellow dye of the formula (105), 1.2 parts of the red dye of the formula (104) and 1.3 parts of the blue dye of the formula (103) are dissolved in 100 parts of water by boiling for a short time. This solution is then added to a solution containing 3 parts of a thickener based on carob flour, 5.0 parts of a padding aid based on a condensation product of a higher-molecular-weight fatty acid with an alkoxyamine and forming a coacervate, 2.0 parts of crystalline monosodium phosphate and 1.0 part of crystalline disodium phosphate in 500 parts of cold water. The mixture is then made up to 1,000 parts with cold water. 300%, relative to the weight of the carpet, of this liquor having a pH of 5.5 to 6.5 are applied to an untreated tufted nylon-6,6 carpet at a carpet velocity of 8 meters per minute. The impregnated carpet enters a loop steamer, where it is treated with saturated steam at 98° to 100° for 10 minutes.

After washing in an open-width washing machine, a carpet dyed in a neutral brown shade is obtained.

EXAMPLE 7

The procedure given in Example 6 is repeated, using 1.2 parts of the red dye of the formula (101) instead of 1.2 parts of the red dye of the formula (104), to give a carpet dyed in a brown hue. The procedures of Examples 3 to 7 are repeated, except that an equimolar amount of the dye which, in the form of the free acid, has the formula

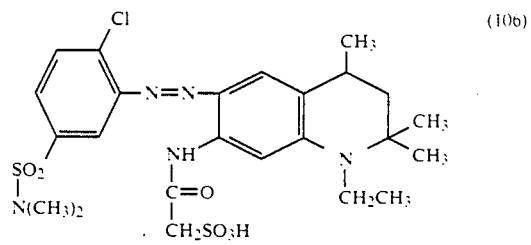

is used instead of the red-dyeing dye of the formula (101), to give the same good results.

The procedure of Example 1 is repeated, except that the combination of dyes in amounts of the same colour strength shown in the Table below is used instead of the combination of the dyes of the formulae (101), (102) and (103) mentioned in Example 1, to give likewise fabrics dyed in an even brown shade.

The red-dyeing colouring dye used in the Table below is the dye of the formula (106).

TABLE

| Yellow- or orange-dyeing component | blue-dyeing component |
|---|---|
| ![structure] (102) | ![structure] (103) |

TABLE-continued

| Yellow- or orange-dyeing component | blue-dyeing component |
|---|---|
| (102) Ar-N=N-Ar(OCH₃)-N=N-Ar-OCH₃ with SO₃H | (107) 1-amino-4-(4-propionamidoanilino)-2-sulfo anthraquinone |
| (102) | (108) 1-amino-4-[4-methyl-3-(N-2-hydroxyethylsulfamoyl)anilino]-2-sulfo anthraquinone |
| (102) | (109) 1-amino-4-(3-propionamidoanilino)-2-sulfo anthraquinone |
| (102) | (110) 1-amino-4-(3-acetamidoanilino)-2-sulfo anthraquinone |
| (102) | 1:1 mixture of the dyes of the formulae (103) and (107) |
| (102) | 1:1 mixture of the dyes of the formulae (103) and (109) |
| (102) | 1:1 mixture of the dyes of the formulae (108) and (107) |
| (111) HO₃S-Ar-N=N-Ar(OCH₃)(CH₃)-N=N-Ar-OCH₃ | 1:1 mixture of the dyes of the formulae (108) and (109) |
| (111) | 1:1 mixture of the dyes of the formulae (108) and (110) |
| (111) | Dye of the formula (110) |

70:30 mixture of the dyes of the formula (102) and

TABLE-continued

| Yellow- or orange-dyeing component | blue-dyeing component |
|---|---|
| (112) [structure with O-SO₂, Cl, N=N-C, C-CH₃, H₂N, C, N, Cl, HO₃S] | Dye of the formula (103) |
| 1:1:1 mixture of the dyes of the formulae (102), (111) and (112)<br>Dye of the formula (110) | 1:1 mixture of the dyes of the formulae (103) and 109)<br>Dye of the formula (103) |

PREPARATION EXAMPLE FOR THE COMPOUND OF THE FORMULA (101)

91.4 parts of 7-amino-1-ethyl-1,2,3,4-tetrahydro-2,2,4-trimethylquinoline are dissolved at room temperature in 285 parts of tetrahydrofuran, and 106.6 parts of anhydrous sodium acetate are added with stirring over a period of 2 minutes. 64.2 parts of chloroacetyl chloride are then added dropwise at an internal temperature of 20° over a period of 30 minutes with ice cooling. The mixture is stirred at 20° for 1 hour, and then 250 parts of water are added dropwise. Stirring at 20° is continued for 10 minutes, the aqueous phase is then separated off, and the organic phase is extracted once with 100 parts of 15% aqueous sodium chloride solution. The organic phase is then dried over sodium sulfate, and the crude product is obtained by concentrating the solution on a rotary evaporator. 133.1 parts of a grey powder of the formula

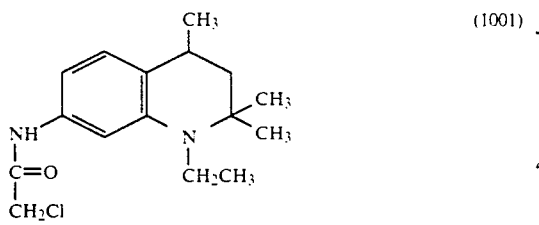

are obtained.

133.1 parts of the compound of the formula (1001) are added at room temperature to 600 parts of water with stirring. The pH is then brought to 7 by addition of 30% aqueous sodium hydroxide solution, and 65 parts of sodium sulfite are added. The temperature is then increased to about 95°, and the mixture is stirred at 93° to 95° for 4 hours. After cooling to 70°, 105 parts of sodium chloride are sprinkled into the mixture over a period of 3 minutes. Stirring is then continued for 1 hour without heating, the mixture is cooled at 15° and filtered. The crude product isolated by filtration is dried at 60° C. in vacuo for 12 hours and then stirred into 275 parts of anhydrous ethyl acetate. After stirring for 15 minutes, the product is filtered off with suction through a nutsche filter, washed with 50 parts of anhydrous ethyl acetate and dried in air.

186 parts of a grey powder of the formula

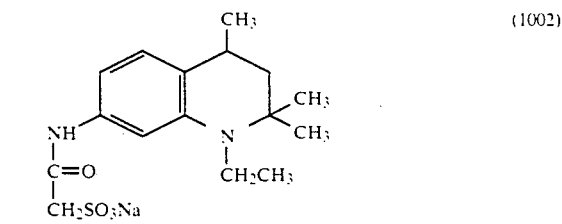

are obtained.

40 parts of acetic acid (80%) and 4 parts of hydrochloric acid (32%) are initially introduced at about 10° with stirring. 2.1 parts of 4-amino-3-chlorophenyl methyl sulfone are then added, and the temperature is lowered to 0°. A solution of 0.74 part of NaNO₂ in 3 parts of water is then added over a period of 1 minute, the mixture is diazotized at 0° to 3° C., stirred for another 45 minutes, during which the temperature is 0° to 3°. 1 part of sulfamic acid is then added, stirring is continued for a short time, and 3.65 parts of the coupling component of the formula (1002) are then added over a period of 1 minute. Stirring at 0° to 3° is continued for 30 minutes, and 15 parts of sodium acetate×3H₂O are then added in 3 portions over a period of 15 minutes. After stirring at 0° to 3° for another 30 minutes, a solution of 6 parts of sodium acetate, 3 parts of sodium carbonate and 30 parts of water is added over a period of 30 minutes, during which the reaction mixture does not warm to more than 20°. 100 parts of a 15% aqueous sodium chloride solution are then added over a period of 10 minutes, the dye obtained is filtered off and dried in vacuo at 50°. 6 parts of a reddish powder, which corresponds to the compound of the formula (101), are obtained. The dye obtained dyes natural and synthetic polyamide fibre material in red hues.

What is claimed is:

1. A process for the trichromatic dyeing or printing of natural and synthetic polyamide fibre materials which comprises using at least one red dye of the formula

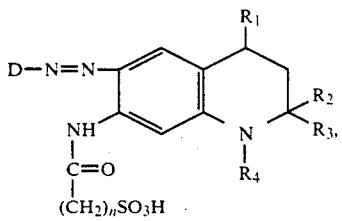
(1)

in which D is a diazo component of the benzene or naphthalene series, $R_1$, $R_2$, $R_3$ and $R_4$, independently of one another, are hydrogen or substituted or unsubstituted $C_1$-$C_8$alkyl and n is the number 1,2,3,4 or 5, together with at least one yellow or orange dye of the formula

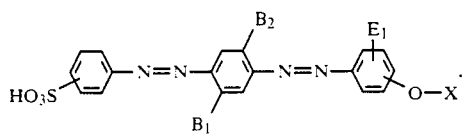
(2)

in which $B_1$, $B_2$ and $E_1$ are hydrogen, $C_{1-4}$alkyl or $C_{1-4}$alkoxy and X is straight-chain or branched $C_{1-4}$alkyl or straight-chain or branched $C_{2-4}$hydroxyalkyl, or

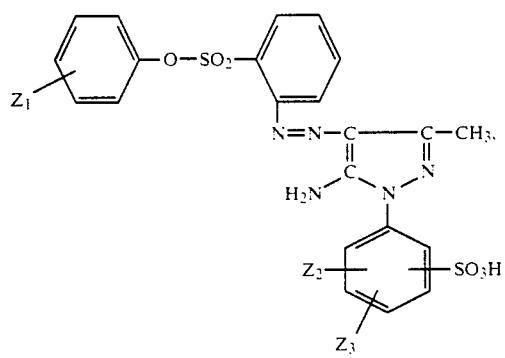
(3)

in which $Z_1$, $Z_2$ and $Z_3$, independently of one another, are hydrogen, halogen, $C_{1-4}$alkyl or $C_{1-4}$alkoxy, or mixtures of dyes of the formula (2) and (3), or a yellow dye of the formula

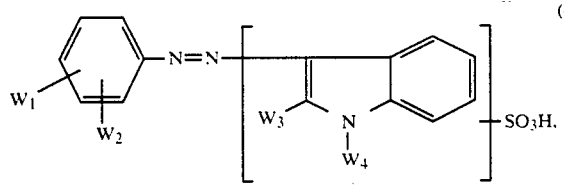
(4)

in which $W_1$ is hydrogen, $C_{1-4}$alkyl, $C_{1-4}$alkoxy, halogen, $C_{2-4}$alkanoylamino or a substituted or unsubstituted arylsulfonyl, aryloxy or arylcarbonyl radical, $W_2$ is hydrogen, halogen, a substituted or unsubstituted alkyl, aryloxy or aryloxysulfonyl radical or a radical of the formula

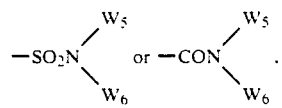

$W_3$ is a substituted or unsubstituted alkyl or aryl radical, $W_4$ is hydrogen or alkyl and $W_5$ and $W_6$, independently of one another, are hydrogen or a substituted or unsubstituted alkyl, cycloalkyl or aryl radical, or mixtures of dyes of the formulae (2), (3) and (4) and at least one blue dye of the formula

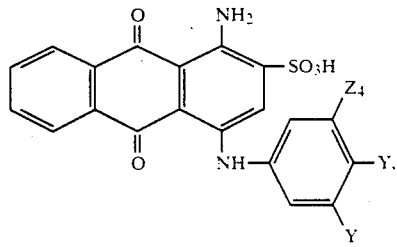
(5)

in which one Y is hydrogen or methyl and the other Y is $C_{2-4}$alkanoylamino or $C_2$-$C_4$hydroxyalkylsulfamoyl and $Z_4$ is hydrogen or methyl.

2. A process according to claim 1, wherein a dye of the formula

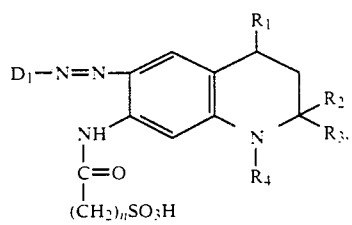
(6)

in which $D_1$ is phenyl or naphthyl and each of these radicals can be substituted by $C_1$-$C_8$alkyl, $C_1$-$C_8$alkoxy, $C_2$-$C_8$alkanoylamino, $C_2$-$C_8$alkoxycarbonylamino, $C_2$-$C_8$alkanoyl, $C_5$-$C_7$cycloalkylcarbonyl, $C_5$-$C_7$cycloalkylcarbonyl which is substituted in the cycloalkyl ring by $C_1$-$C_4$alkyl, halogen, sulfo or sulfato, benzoyl, benzoyl which is substituted in the phenyl ring by $C_1$-$C_4$alkyl, halogen, sulfo or sulfato, benzothiazole, benzoxazole, $C_1$-$C_4$alkyl-, halogen-, sulfo or sulfato-substituted benzothiazole or benzoxazole, benzoylamino, amino, mono- or dialkylamino of 1 to 8 carbon atoms in the alkyl radical, phenylamino, $C_2$-$C_8$alkoxycarbonyl, nitro, cyano, trifluoromethyl, halogen, sulfamoyl, sulfamoyl which is mono- or disubstituted on the nitrogen atom by $C_1$-$C_4$alkyl, $C_5$-$C_7$cycloalkyl or phenyl, carbamoyl, ureido, hydroxyl, $C_1$-$C_8$alkylsulfonyl, phenylsulfonyl, phenylsulfonyl which is substituted in the phenyl ring by $C_1$-$C_4$alkyl, halogen, sulfo or sulfato, carboxyl, sulfomethyl, sulfo, sulfato, thiosulfato and phenylazo and naphthylazo groups, and, if appropriate, 2 adjacent substituents of the ring systems mentioned can each form further fused-on phenyl rings or cyclohexyl rings and $R_1$, $R_2$, $R_3$, $R_4$ and n are as defined under formula (1), in which each of the radicals mentioned above for $D_1$ can preferably be substituted by $C_1$-$C_8$alkyl, $C_1$-$C_8$alkoxy, $C_2$-$C_8$alkanoylamino, $C_2$-$C_8$alkoxycarbonylamino, $C_2$-$C_8$alkoxycarbonylamino, $C_2$-$C_8$alkanoyl, $C_5$-$C_7$cycloalkylcarbonyl, $C_5$-$C_7$cycloalkylcarbonyl which is substituted in the cycloalkyl ring by $C_1$-$C_4$alkyl or halogen, benzoyl, benzoyl which is substituted in the phenyl ring by $C_1$-$C_4$alkyl or halogen, benzothiazole, benzoxazole, benzoylamino, amino, mono- or dialkylamino of 1 to 8 carbon atoms in the alkyl radical, phenylamino, $C_2$-$C_8$alkoxycarbonyl, nitro, cyano, trifluoromethyl, halogen, sulfamoyl, sulfamoyl which is mono- or disubstituted on the nitrogen atom by $C_1$-$C_4$alkyl, $C_5$-$C_7$cycloalkyl or phenyl, carbamoyl, ureido, hydroxyl, $C_1$-$C_8$alkylsulfonyl, phenylsulfonyl, phenylsulfonyl which is substituted in the phenyl ring by $C_1$-$C_4$alkyl and/or halogen, carboxyl, sulfomethyl, sulfo, sulfato, thiosulfato and phenylazo and napthylazo groups, and, if desired, 2 adjacent substituents of the ring systems mentioned can each form further fused-on phenyl rings or cyclohexyl rings and $R_1$, $R_2$, $R_3$, $R_4$ and n are as defined under formula (1) is used as the red dye.

3. A process according to claim 1, wherein a dye of the formula

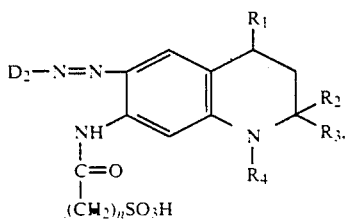

(7)

in which $D_2$ is phenyl which can be substituted by $C_1$-$C_8$alkyl, $C_2$-$C_8$alkanoyl, $C_2$-$C_8$alkoxycarbonyl, $C_5$-$C_7$cycloalkylcarbonyl, benzoyl, benzoyl which is substituted in the phenyl ring by $C_1$-$C_4$alkyl, halogen, sulfo or sulfato, benzothiazole, benzoxazole, $C_1$-$C_4$alkyl-, halogen-, sulfo- or sulfato-substituted benzothiazole or benzoxazole, halogen, phenylsulfonyl, phenylsulfonyl which is substituted in the phenyl ring by $C_1$-$C_4$alkyl, halogen, sulfo or sulfato, $C_1$-$C_8$alkylsulfonyl, sulfamoyl which is mono- or disubstituted on the nitrogen atom by $C_1$-$C_4$alkyl, $C_5$-$C_7$cycloalkyl or phenyl, and $R_1$, $R_2$, $R_3$, $R_4$ and n are as defined under formula (1), in which the radical mentioned above for $D_2$ is preferably substituted by $C_1$-$C_8$alkyl, $C_2$-$C_8$alkanoyl, $C_2$-$C_8$alkoxycarbonyl, $C_5$-$C_7$cycloalkylcarbonyl, $C_1$-$C_4$alkylsulfonyl, benzoyl, benzoyl which is substituted in the phenyl ring by $C_1$-$C_4$alkyl or halogen, benzothiazole, benzoxazole, halogen, phenylsulfonyl, phenylsulfonyl which is substituted in the phenyl ring by $C_1$-$C_4$alkyl or halogen, sulfamoyl which is substituted by $C_1$-$C_8$alkyl, $C_5$-$C_7$cycloalkyl or phenyl, and $R_1$, $R_2$, $R_3$, $R_4$ and n are as defined under formula (1) is used as the red dye.

4. A process according to claim 3, wherein a dye of the formula (7) is used, in which the radical mentioned for $D_2$ can be substituted by $C_1$-$C_8$alkyl, $C_2$-$C_8$alkanoyl, $C_2$-$C_8$alkoxycarbonyl, $C_5$-$C_7$cycloalkylcarbonyl, benzoyl, benzoyl which is substituted in the phenyl ring by $C_1$-$C_4$alkyl or halogen, benzothiazole, benzoxazole, halogen, phenylsulfonyl, phenylsulfonyl which is substituted in the phenyl ring by $C_1$-$C_4$alkyl or halogen, $C_1$-$C_8$alkylsulfonyl, sulfamoyl which is mono-or disubstituted on the nitrogen atom by $C_1$-$C_4$alkyl, $C_5$-$C_7$cycloalkyl or phenyl.

5. A process according to claim 1, wherein a red dye is used in which $R_1$ is hydrogen or $C_1$-$C_4$alkyl, in particular methyl, $R_2$ and $R_3$, independently of one another are hydrogen or $C_1$-$C_4$alkyl, in particular methyl, $R_4$ is $C_1$-$C_4$alkyl, in particular ethyl, n is the number 1 or 2.

6. A process according to claim 1, wherein a red dye according to claim 1 is used and a dye of the formula

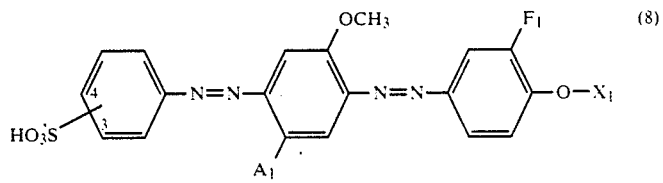

(8)

is used as yellow or orange dye, in which $A_1$ is hydrogen or methyl, $F_1$ is hydrogen or methyl and $X_1$ is methyl, ethyl, β-hydroxyethyl, β-hydroxypropyl, β-hydroxybutyl or α-ethyl-β-hydroxyethyl, and the sulfo group is bound in the 3 or 4 position, or a mixture of at least one dye of the formula (8) and a yellow dye of the formula

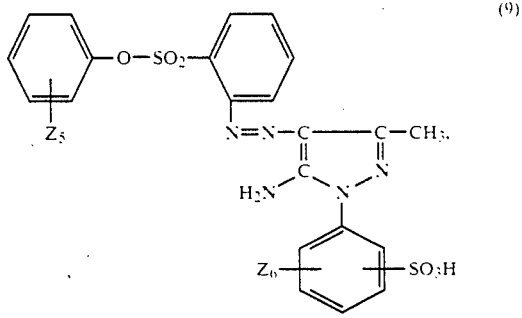

(9)

in which $Z_5$ and $Z_6$, independently of one another, are hydrogen, methyl or chlorine, or a yellow dye of the formula

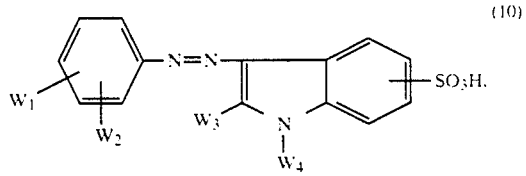

(10)

in which $W_1$ is hydrogen, methyl, chlorine, methoxy, ethoxy, o-methylphenoxy, phenoxy, acetylamino, phenylsulfonyl, p-methylphenylsulfonyl, p-chlorophenylsulfonyl, naphthylsulfonyl, p-methylbenzoyl or p-chlorobenzoyl, $W_2$ is hydrogen, chlorine, methyl, trifluoromethyl, o-methylphenoxy, o-chlorophenoxy, o-chlorophenoxysulfonyl, —$SO_2NH_2$, N-$C_{1-2}$alkylaminosulfonyl, N,N-dimethylaminosulfonyl, N-methyl-N-β-hydroxyethylaminosulfonyl, N-methyl-N-cyclohexylaminosulfonyl, N-phenylaminosulfonyl, N-o-methylphenylaminosulfonyl, N-o-chlorophenylaminosulfonyl, N-m-trifluoromethylphenylaminosulfonyl, N-ethyl-N-phenylaminosulfonyl, —$CONH_2$ or —$CON(CH_3)_2$, $W_3$ is methyl or phenyl and $W_4$ is hydrogen, methyl, ethyl or octyl, or a mixture of at least one dye of the formula (8) and a dye of the formula (10) are used together with at least one blue dye of the formula

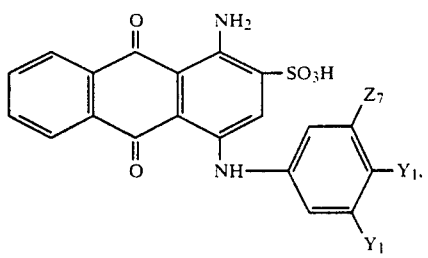
(11)

in which $Y_1$ is hydrogen or methyl and the other $Y_1$ is acetylamino, propionylamino or $C_{2-4}$hydroxyalkylsulfamoyl and $Z_7$ is hydrogen or methyl, or a mixture of the blue dyes of the formula

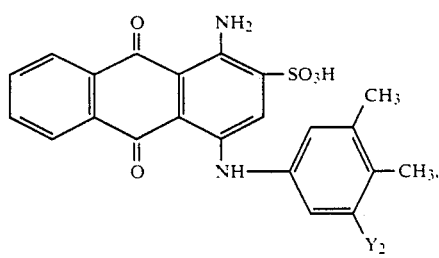
(12)

in which $Y_2$ is a $C_{2-4}$hydroxyalkylsulfamoyl radical, and

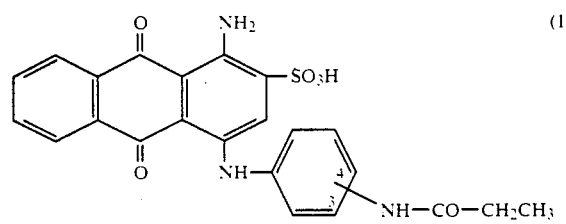
(13)

in which the radical —NH—CO—CH$_2$CH$_3$ is bound in the 3 or 4 position are used.

7. A process according to claim 1, wherein a dye of the formula

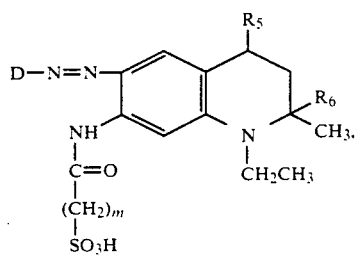
(14)

in which $R_5$ and $R_6$, independently of one another, are hydrogen or methyl, m is the number 1 or 2 and D is as defined in claim 1, in particular in which D is as defined in claim 2 for $D_1$ or as defined in claim 3 for $D_2$ is used as the red dye.

8. A process according to claim 1, wherein a red dye of the formula

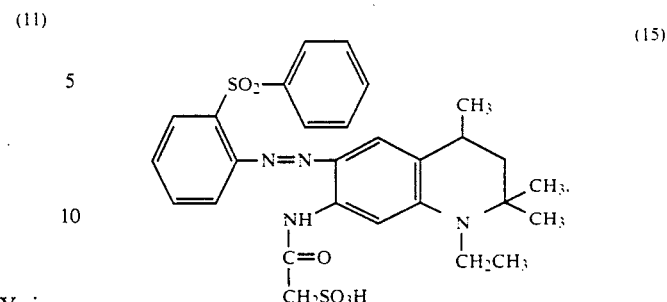
(15)

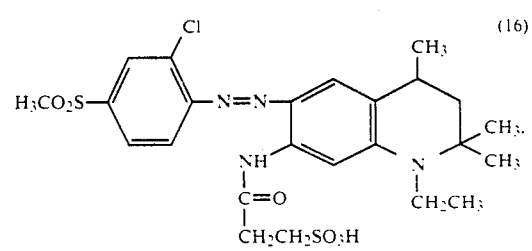
(16)

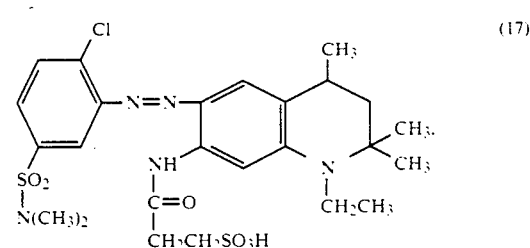
(17)

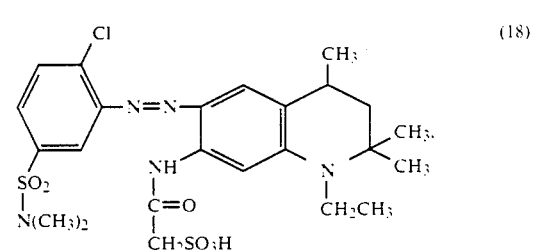
(18)

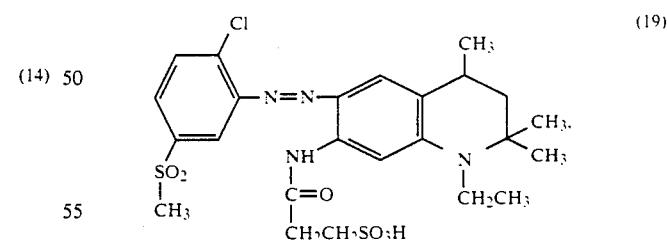
(19)

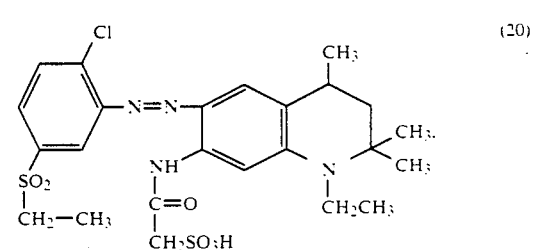
(20)

-continued

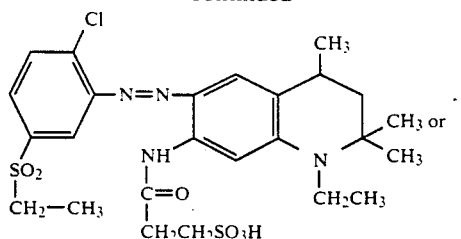 (21)

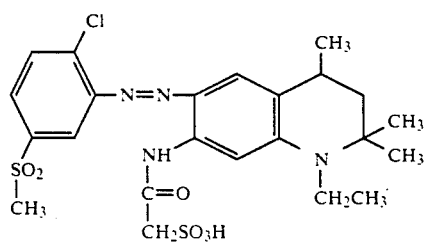 (22)

is used together with the yellow dye of the formula

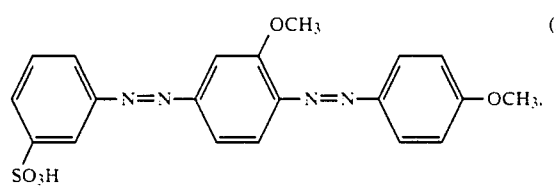 (23)

or the orange dye of the formula

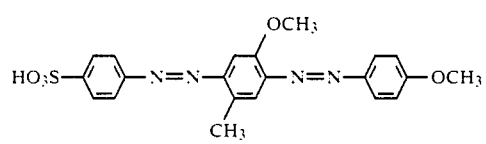 (24)

or a mixture of the yellow dye of the formula (23) with the orange dye of the formula (24) or a mixture of the dyes of the formula (23) and/or (24) with the dye of the formula

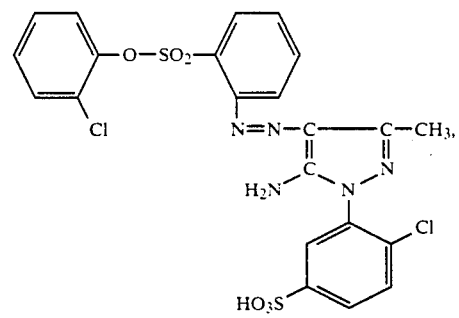 (25)

in which the weight ratio of the dyes of the formulae (23) and (24) is 60:40 to 40:60 and in particular 1:1 and the weight ratio of the dyes of the formulae (23) or (24) and (25) is 80:20 to 20:80 and in particular 70:30, and the weight ratio of the dyes of the formulae (23), (24) and (25) is 60:20:20, 20:60:20 to 20:20:60 and in particular 1:1:1, or the yellow dye of the formula

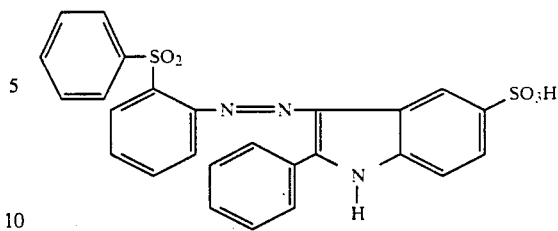 (26)

and at least one of the blue dyes of the formulae

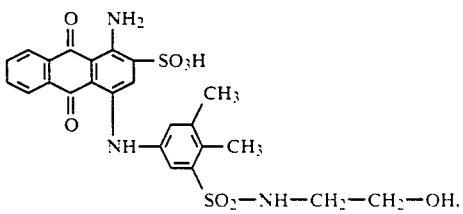 (27)

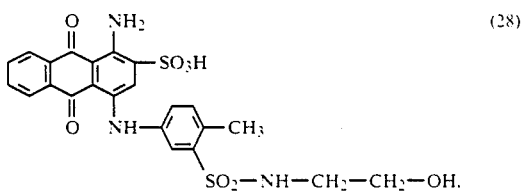 (28)

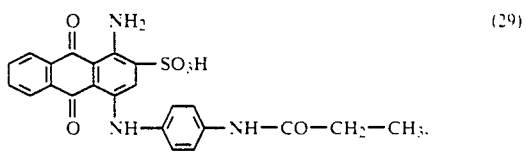 (29)

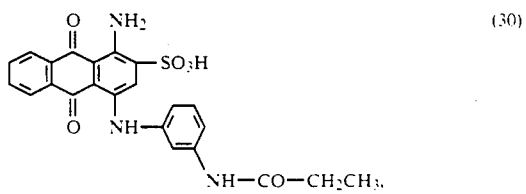 (30)

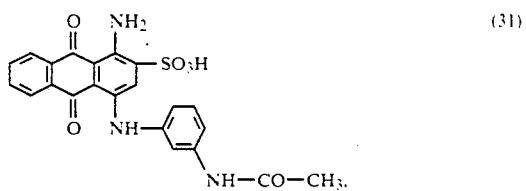 (31)

or a mixture of a dye of the formula (27) or (28) with a dye of the formula (29), (30) or (31) is used.

9. A process for the trichromatic dyeing or printing of materials made of natural or synthetic polyamide, which comprises treating these materials with a dyeing liquor or printing paste which contains a dye mixture according to claim 1 and water and, if appropriate, further additives.

10. An aqueous dyeing liquor or printing paste, which contains water, a dye mixture according to claim 1 and, if appropriate, further additives.

11. A textile material, dyed or printed by a process according to claim 1.

12. A polyamide carpet, dyed or printed according to claim 11.

13. A textile material dyed or printed by using a dyeing liquor or printing paste according to claim 10.

* * * * *